Figure 1:
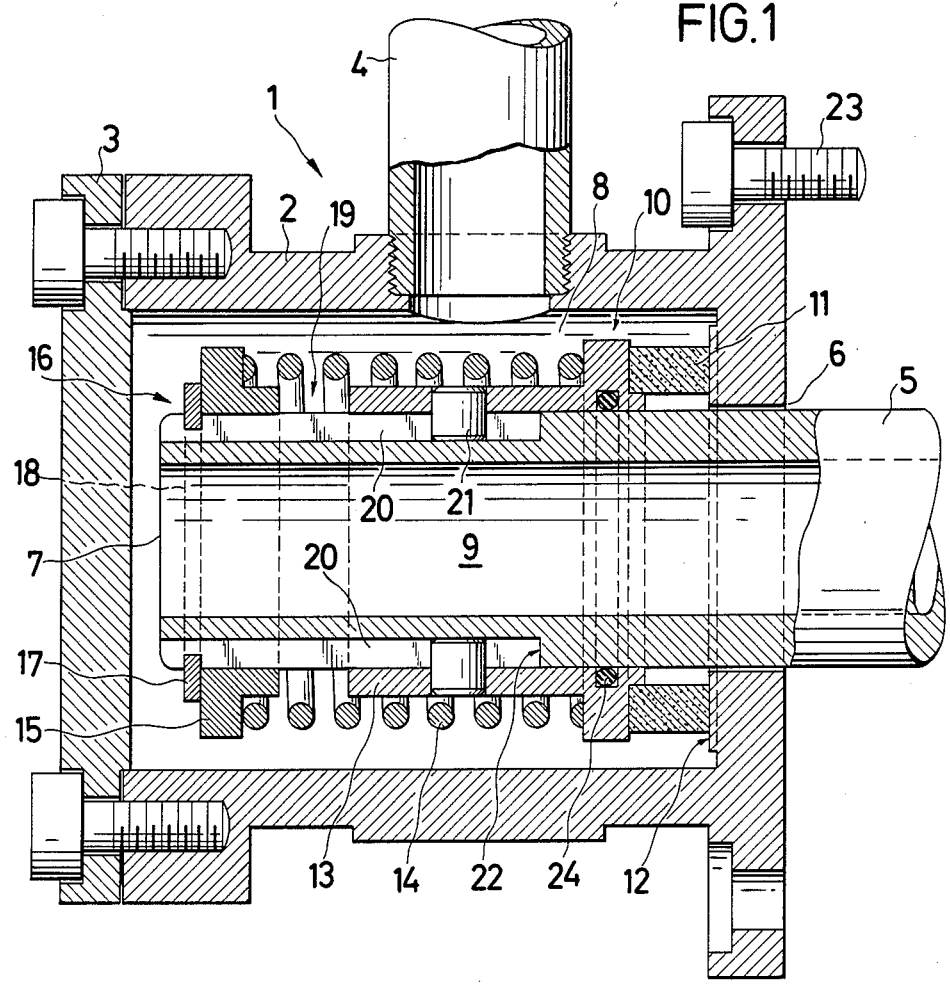

United States Patent [19]

Buchalla

[11] Patent Number: 4,786,061

[45] Date of Patent: Nov. 22, 1988

[54] SAFETY ROTARY TRANSMISSION WITH FACE SEAL

[75] Inventor: Artur Buchalla, Bobingen, Fed. Rep. of Germany

[73] Assignee: Hoechst Aktiengesellschaft, Fed. Rep. of Germany

[21] Appl. No.: 60,111

[22] Filed: Jun. 9, 1987

[30] Foreign Application Priority Data

Jun. 11, 1986 [DE] Fed. Rep. of Germany ....... 3619630

[51] Int. Cl.⁴ .............................................. F16J 15/34
[52] U.S. Cl. ..................................... 277/81 R; 277/91; 277/93 SD; 277/94
[58] Field of Search ................... 277/81 R, 91, 85–87, 277/93 R, 93 SD, 94

[56] References Cited

U.S. PATENT DOCUMENTS

| 1,528,334 | 3/1925 | Hurd ..................................... 277/81 |
| 2,818,285 | 12/1957 | Greiner ................................. 277/91 |
| 2,992,842 | 7/1961 | Shevchenko et al. ............ 277/81 X |
| 3,033,579 | 5/1962 | Seaver .................................. 277/91 |
| 3,080,170 | 3/1963 | Colby ................................ 277/93 R |

FOREIGN PATENT DOCUMENTS 902815 8/1962 United Kingdom .................. 277/81

Primary Examiner—Robert S. Ward
Attorney, Agent, or Firm—Connolly & Hutz

[57] ABSTRACT

Safety rotary transmissions allow the transfer of fluid media from a stationary casing into the inside of a rotating shaft and back. The apparatus, which has only one face seal, is provided with a blocking device which prevents a contact of metallic parts of the face seal with one another even if there is severe wear of the sliding sealing ring. An exchange of the sealing ring is possible without dismantling the casing.

7 Claims, 2 Drawing Sheets

SAFETY ROTARY TRANSMISSION WITH FACE SEAL

The invention relates to an apparatus for the transfer of fluid media from a stationary casing to the inside of a rotating shaft or of a body connected to this rotating shaft, such as a galette, cylinder, roller or the like.

To transfer gaseous or liquid substances from stationary lines or casings into rotating machine parts, or vice versa, so-called rotary transmissions are necessary. These fittings—also known as sealing heads or couplings—are equipped with a number of face seals which are innately subject to wear. The wear is relatively great in particular in the case of rotary transmissions highly stressed in terms of temperature, pressure and rotational speed and the service lives of the seals used are correspondingly short. This applies in particular when media are used which have no lubricating quality or exert an abrasive effect on the sealing materials.

Possible applications of such rotary transmissions are frequently to be found in chemical engineering, for example in the admission of reactants to rotating or tumbling reactors. One example of a preferred possible application for such rotary transmissions is in the fiber and textiles industry, for the supply and removal of heating media to drawing frames, galettes or cylinder drums. For example, for the heating of a galette, it is necessary to supply a heat transfer medium to the cylinder jacket and remove the cooled transfer medium through hollow bearing shafts. In the case of the known galettes for the heat treatment and possibly stretching of man made fibers in cable form, usually overhung galettes exceeding 1 meter in working width are used. With overhung rotating bodies, it is necessary to use a hollow bearing shaft both to supply the heating medium and, accordingly, to remove the used, cooled transfer medium again from the rotating body and the hollow shaft.

For such purposes, it has already been proposed several times to use a heat transfer oil which still exhibits adequate lubricating properties for the relatively highly stressed bearing even under the chosen conditions (see for example German Offenlegungsschrift No. 1,160,564). However, such methods entail a number of disadvantages, one in particular being the low attainable temperature constancy of such systems. In the temperature control of relatively large cylindrical bodies there is inevitably a temperature gradient, which can only be moderated by a greatly increased flow rate. Such temperature-control systems are usually unusable for industrial application on textile machines. The temperature constancy required of the rotating bodies of, for example, $\pm 1°$ C. over the entire working width of a large galette can only be achieved by means of condensation heating. In this case, the heat transfer medium is supplied as steam. Condensation takes place at the same pressure and at the same temperature throughout the system. Furthermore, utilization of the condensation enthalpy allows the transfer of large quantities of heat over a small area. The use of high-pressure steam as temperature control medium has been found to be particularly economical. However, this temperature control medium has no lubricating properties whatsoever with respect to sealing materials and therefore often results in a reduced service life of the sealing systems used.

The rotary transmissions previously known, for example for heating medium supply and removal to and from galettes and stretching frames, are described in German Offenlegungsschrift No. 2,431,806. According to this prior art, it is particularly favorable to connect both the heating medium supply and the removal pipe to the galette in a rotationally fixed way. The disclosed solution according to this citation has, however, two face seals which are used for sealing off the temperature control medium steam in the stationary part of the rotary transmission from the outside world and from the heating medium removal line. The design presented in this citation is complicated and susceptible to faults. If high-pressure steam of, for example, 23 bar gage pressure corresponding to a temperature of approximately 220° C. is used, the lubricating effect of the steam on the sealing elements used is extremely small. It is therefore possible that the actual sealing elements are used up unobserved within a short time and then the metal parts intended as supporting elements for these sealing elements come into contact with one another. If this is not noticed in time, the supporting elements are damaged within a very short time. There is therefore even the risk that the said parts are damaged so severely under these conditions that a rupture of the rotary transmission may occur under high gage pressures, in which case the sealing head could break apart and even be flung out in an extremely dangerous way. Such risks of course exist in particular in the case of machines which are equipped with highly stressed rotary transmissions which are however difficult to monitor due to their locational arrangement. Under these circumstances, the rotary transmissions previously known can entail a high risk of accidents.

It has therefore always been the object to avoid such ruptures or fractures of machine parts on rotary transmissions. Furthermore, the object has been to develop rotary transmissions in which the effectiveness of the sealing materials used can be monitored with reference to simple indications.

There are known designs of sealing heads in which markings are used with the aim of showing the advance of wear on the seal. This method requires a complicated routine of regular checks by the operating personnel and is therefore not sufficiently reliable. Of course, checking is even more complicated and difficult if these marks cannot be applied because the seal wear is compensated within the head. In such cases, wear can only be established in a laborious way by measuring with appropriate caliper gages or the like, which is of course particularly troublesome in continuous operation of such equipment. There has therefore been the additional object of developing an apparatus which indicates the failure of a seal in a way avoiding any risk to the operating personnel and of course also to the production process.

Furthermore, it has been the object to find an appropriate rotary transmission in which exchanging of the sealing rings is considerably simplified. Such an exchange should be possible in particular without having to dismantle the entire sealing head and without having to carry out an adjustment of parts.

The main features of the present invention are the use of only one face seal, to be precise even when transferring two different media from one stationary housing into a hollow shaft and the use of a blocking device which limits the displacement of the hollow body on the surface of the hollow shaft. Such a blocking device may, for example, comprise of a longitudinal groove in the hollow shaft and a corresponding guide pin in the sleeve body, the longitudinal groove from the face of the hollow shaft up to a given length being dimensioned such that the guide pin connected to the sleeve body prevents direct contact of sleeve body and supporting surface. Furthermore, the compression spring required for operation of the face seal has to be held by a retaining ring, the position of which can be fixed on the hollow shaft by a fixing device. This fixing device has to ensure that the retaining ring cannot slide off the hollow shaft. In the simplest case, such a fixing device may consist, for example, of a locking ring which is held in an annular groove in the hollow shaft. Furthermore, the stationary casing must have a closable opening, for example a cover which allows an opening of the casing opposite the face of the hollow shaft. Such a device makes it possible, if the fixing device for the retaining ring is suitably designed, to carry out an exchange of a sealing ring without dismantling the entire rotary transmission.

If a separate transfer of two different fluid media into the hollow shaft or back is to be provided, the apparatus according to the invention has to have a pipe which is guided concentrically in the hollow shaft. In the simplest case, this guidance may take the form of a simple screw connection in the closure cover of the stationary casing. There is then no rotational movement to be sealed off in the rotary transmission between the inside pipe and the casing or else between inside pipe and the hollow shaft.

The apparatus according to the invention allows the transfer of fluid media from a stationary casing into a rotating hollow shaft or into devices connected to this hollow shaft and back. In the operation of this apparatus, it is inevitable that the sealing material used, the wearable sealing ring, becomes worn. According to the present invention, this wear is compensated to a certain extent, as in the prior art, by the extension of a compression spring. Unlike the prior art, however, a metallic contact of sleeve body and supporting surfaces is prevented by the use of a blocking device. So if the wear of the sealing ring used can no longer be compensated by a sliding-after of the sleeve body, a leakage inevitably occurs, i.e. there is a leak at the point where the hollow shaft enters the stationary casing.

This event, to be avoided absolutely according to the prior art, is utilized here to provide an indication for the necessary exchange of the sealing ring. When using harmless, and in particular non-toxic, heat transfer media, i.e. in particular when using steam, usually no special safety precautions have to be taken to prevent the escape of the heat transfer medium, provided it can be assured that no member of the operating staff can be in the vicinity of the leakage point. So here a slight plume of steam would indicate that, in the rotary transmission according to the invention, the worn sealing ring has to be replaced by a new one. If, on the other hand, an escape of a heat transfer medium could constitute a hazard, the actual point of entry has to be encapsulated in a suitable way. This may be carried out, for example, by attaching a lightweight metal housing which additionally has, for example, cooling fins and an outlet, via which the escaping leakages can be collected and carried away. In such a capsule, an appropriate sensor may also be installed, which emits a signal when leakages occur. If possibly harmful heat transfer media are used, this capsule may of course additionally be connected to an extraction system or the like. It goes without saying that this capsule need not have any special, complicated seal on the shaft. After all, the pressure inside this capsule is only the atmospheric pressure of the surrounding air or a slight partial vacuum if the capsule has been connected to an extraction system.

Unlike the prior art, it is possible to connect the safety rotary transmission firmly to, for example, the bearing casing of the associated galette if desired. The spring-loaded design of the face seal used and the fixed, unrotatable arrangement of a pipe inside the hollow shaft for a second medium has the result that the stresses on the individual components otherwise observed in such apparatuses only occur to a reduced extent. Particular measures for the compensation of stresses are therefore not necessary.

Exemplary embodiments as reproduced in the enclosed figures are intended to assist in further understanding of the invention.

FIG. 1 shows, in cross section, a safety rotary transmission for the communicating connection of a space in a stationary casing with a space in a rotating hollow shaft.

Figure 2:
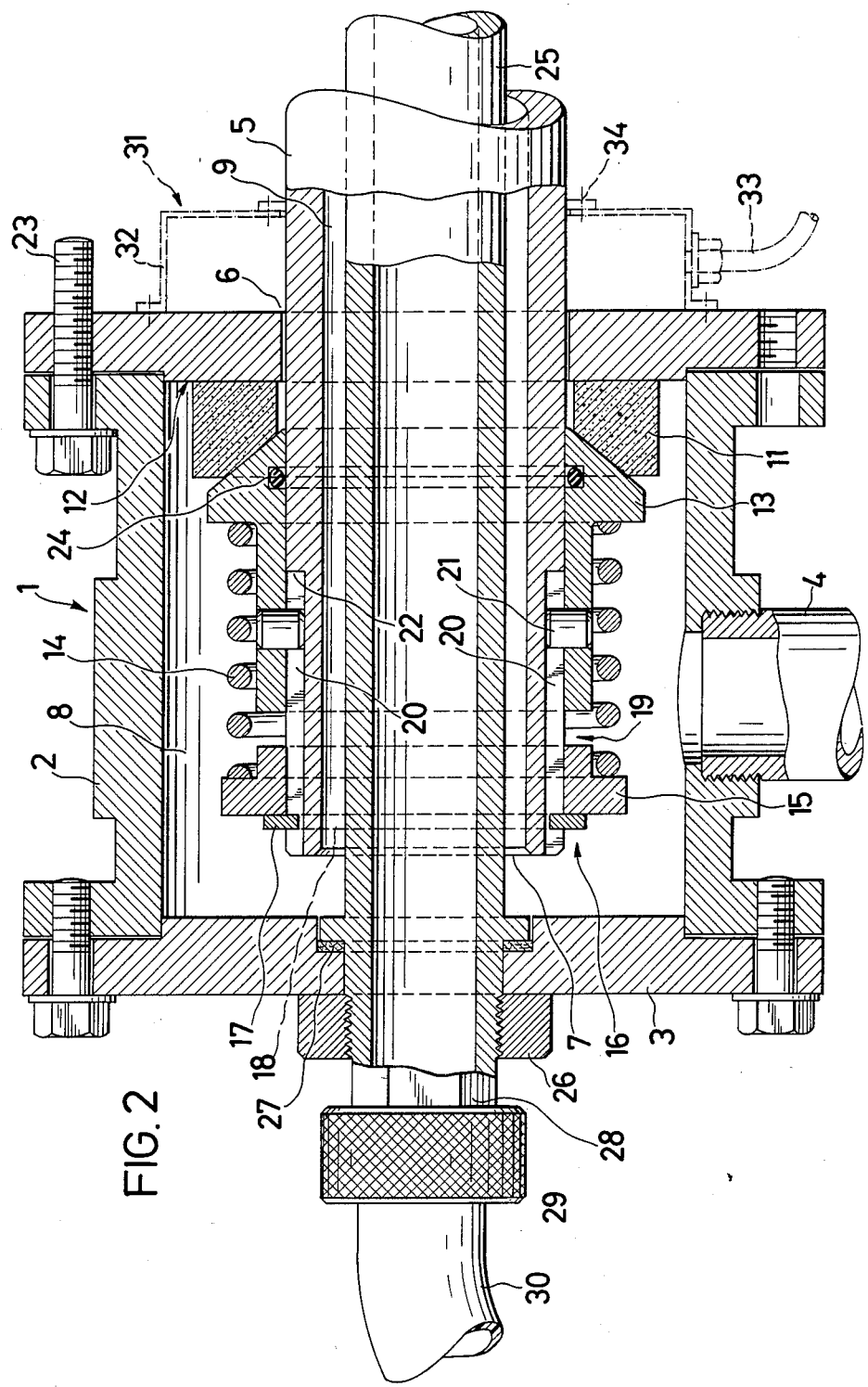

FIG. 2 correspondingly shows a cross section through a rotary transmission for two fluid media to be conveyed separately.

In FIG. 1, the pressure-tight closable stationary casing is identified by 1. It comprises the hollow body 2, a pressure-tight closure 3, which is to be opened, and a connecting line for a fluid medium 4. The point of entry of the hollow shaft 5 into the stationary casing 1 has been identified by 6. The hollow shaft 5 has an open face 7. The open face is at a slight distance from the closure 3 of the stationary casing 1, so that a fluid medium can flow from the connection 4 through the inner space 8 of the hollow body 2 and from there via the open face 7 of the hollow shaft into the inner space 9 of the hollow shaft.

Sealing between the rotatable hollow shaft 5 and the stationary casing 1 is carried out by means of a face seal 10, a sealing ring 11 being pressed onto a supporting surface 12. The actual face seal 10 in this case comprises a sleeve body 13 which is displaceable along the hollow shaft 5, a compression spring 14, a sliding sealing ring 11, a retaining ring 15 and a fixing device 16. In the exemplary embodiment of FIG. 1, this fixing device 16 consists of a circlip 17 which is guided in an annular groove 18. Furthermore, the face seal has blocking devices 19, which in the present case comprises a longitudinal groove 20 and a guide pin 21, which is firmly connected to the sleeve body 13. The blocking devices 19 operate in such a way that they allow displacement of the sleeve body 13 on the hollow shaft 5 only in a certain area. The sleeve body 13 can be mounted on the hollow shaft and then displaced in the direction of the supporting surface 12 up until where the guide pins 21 come up against the stop edges 22 of the guide grooves. The position of these stops 22 is to be dimensioned such that, even if the guide pin 21 contacts the stop 22, the sleeve body 13 cannot yet come into contact with the supporting surface 12.

The displacement of the sleeve body 13 may be guided by means of a number of blocking devices 19, which are expediently divided symmetrically over the surface of the hollow shaft.

As already stated above, the pressure-tight closure 3 of the stationary casing 1 is to be opposite the face 7 of the hollow shaft 5, but a sufficient gap should be provided between the closure 3 and the face 7. Fixing of the stationary casing to other parts of the apparatus, for example the bearings of the hollow shaft, is indicated diagrammatically by a screw 23.

It is evident from drawing 1 that, during the unavoidable wear of the sealing ring 11, the sleeve body 13 on the hollow shaft is pressed toward the supporting surface 12 by the force of the compression spring 14. To ensure an adequate seal also between hollow shaft 5 and sleeve body 13, a seal 24 has been provided. However, unlike the seal 11, the seal 24 is not subject to the stress of a fast sliding movement. It only has the function of providing appropriate sealing during the very slow displacement of the sleeve body 13 on the hollow shaft 4 when there is increasing wear. If the wear of the sealing ring 11 has progressed to such a point that the sleeve body 13 contacts the stop 22 by its guide pin 21, further shifting of the sleeve body 13 toward the supporting surface 12 is no longer possible.

Sealing will then become increasingly inadequate to prevent an escape of the fluid medium at the point of entry 6.

Exchanging a worn seal 11 is carried out by initially removing the pressure-tight closure 3. Then, after loosening the fixing device 16, i.e. in this case after removal of the circlip 17 from the groove 18, the retaining ring 15, the compression spring 14 and the sleeve body 13 are drawn off the hollow shaft. After removing the remains of the old sealing ring 11, a new one is fitted and the parts are reassembled in the reverse sequence of steps. Once the cover 3 has been closed, this apparatus can be used again.

FIG. 2 shows a very similar rotary transmission in the closure 3 only an additional pipe 25 has been fastened with the aid of a screw connection 26 in such a way that the pipe 25 is located inside the hollow shaft 5, without touching the hollow shaft 5. The necessary sealing-off from the space 8 and the outside world is carried out by means of a conventional seal 27. As the pipe 25 is firmly connected to the closure 3, in other words the parts cannot move relatively to each other, conventional sealing material for fixed connections can be used here. For a correct assembly of the pipe, the screw connection 26 is fitted with an external hexagon 28 and a screw collar 29. From there, the second fluid medium can be transferred for example by means of a hose 30.

As a possible addition, a capsule 31 has also been indicated in FIG. 2 by broken lines in the region of the point of entry 6. This capsule 31 comprises a housing 32 and is provided with a drainage pipe 33 for the leakages escaping. Since the pressure in the capsule 31 is usually atmospheric pressure or, if connected to an extraction system, a slight partial vacuum, a special sealing-off between capsule and rotating hollow shaft 5 is usually not necessary. In other cases, such a seal 34 can be confined to known, very simple configurations.

If a capsule 31 is used for the collection of leakages, it is to be ensured that this occurrence of leakages is made visibly evident. It is therefore expedient to arrange sensors in the capsule 31 or in the drainage pipe 33 which respond for example to a rise in the temperature, a change in the conductivity or a change in the dielectric constant.

I claim:

1. In a safety rotary transmission for fluid media for the communicating connection of at least one space in a stationary casing with at least one space in a rotatable hollow shaft, in which the sealing of the hollow shaft and stationary casing is carried out by means of face seals, axially displaceable sleeve bodies on the hollow shaft being pressed by the action of compression springs onto sliding sealing rings and against supporting surfaces of the stationary casing, the improvement comprising that the hollow shaft (5) open at the face is introduced into a pressure-tight closable, stationary casing (1) and sealed only at the point of entry (6) by means of a single face seal (10) with sealing ring (11), the displacement of the sleeve body (13) on the hollow shaft (5) being limited by means of a compression spring (14) in the direction of the supporting surface (12) by a blocking device (19) such that a direct contact of sleeve body (13) and supporting surface (12) is prevented, that the counter-bearing of the compression spring (14) is provided by a retaining ring (15) and a fixing device (16), and that the stationary casing (1) has a pressure-tight closure (3), which is to be opened, opposite the open face (7) of the hollow shaft (5).

2. The apparatus as claimed in claim 1, wherein the blocking device (19) comprises at least one longitudinal groove (20) in the hollow shaft (5) and at least one guide pin (21) sliding therein, which is connected to the sleeve body (13), and the longitudinal groove (20) extends from the face (7) of the hollow shaft (5) and is dimensioned in its length such that the guide pin (21) connected to the sleeve body (13) prevents a direct contact of sleeve body (13) and supporting surface (12).

3. The apparatus as claimed in claim 1, wherein the parts of the blocking device (19) which effect a limitation of the axial displacement of the sleeve body (13) on the hollow shaft (5) cannot move rotationally relative to each other.

4. The apparatus as claimed in claim 1, wherein the individual parts are to be dimensioned such that, once the pressuretight closure (3) has been opened, the displaceable parts of the face seal (10) with blocking device (19) and fixing device (16) can be dismantled and exchanged without the casing (1) itself or other parts having to be adjusted or dismantled.

5. The apparatus as claimed in claim 1, wherein the fixing device (16) for fixing the retaining ring (15) comprises a circlip (17) and an annular groove (18) in the hollow shaft (5).

6. The apparatus as claimed in claim 1, wherein, for the separate transfer of a second fluid medium in the hollow shaft (5), a pipe (25) is introduced coaxially into the hollow shaft (5) and guided non-rotatably by the closure (3), to which it is fixed.

7. The apparatus as claimed in claim 1, wherein the point of entry (6) of the hollow shaft (5) into the stationary casing (1) is provided with a capsule (31) with drainage pipe (33) in order to be able to indicate, collect and safely drain off leakages occurring at the face seal when the sealing ring (11) is worn.

* * * * *